United States Patent [19]
Stauffer et al.

[11] 3,710,960
[45] Jan. 16, 1973

[54] BOTTOM DISCHARGE MEANS FOR SILO

[75] Inventors: Aaron Z. Stauffer, Ephrata; John H. Herr, Lebanon, both of Pa.; James W. Lepley; James C. Zimmerly, both of Smithville, Ohio

[73] Assignee: Flying Dutchman, Inc., Smithville, Ohio

[22] Filed: Aug. 12, 1971

[21] Appl. No.: 171,153

[52] U.S. Cl. ............ 214/17 DA, 222/227, 222/228, 222/240, 222/413
[51] Int. Cl. .................................................. B65g 65/46
[58] Field of Search ........ 214/17 D, 17 DA; 222/228, 413, 222/227, 240

[56] References Cited
UNITED STATES PATENTS

| 3,424,350 | 1/1969 | Herr et al. ............... 214/17 DA X |
| 3,567,078 | 3/1971 | Herr et al. ............... 214/17 DA X |

Primary Examiner—Robert G. Sheridan
Attorney—C. Hercus Just

[57] ABSTRACT

Bottom discharge means for a silo having a discharge opening in the bottom adjacent the center of the silo, and an auger extending upward from the bottom is rotated by power means to move material down to the discharge opening. Shield means is spaced above the discharge opening to provide a lateral passage beneath the shield to the discharge opening to prevent clogging the same. A housing below the bottom of the silo supports bearings for the auger shaft and drive means, and a discharge chute is formed by said housing and a closure to guide material to discharge means.

16 Claims, 5 Drawing Figures

PATENTED JAN 16 1973 3,710,960
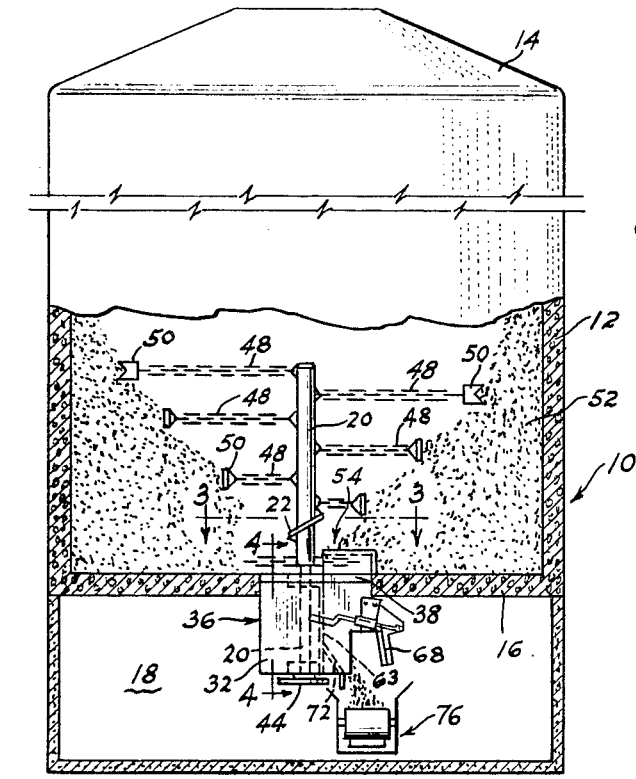
Fig. 1
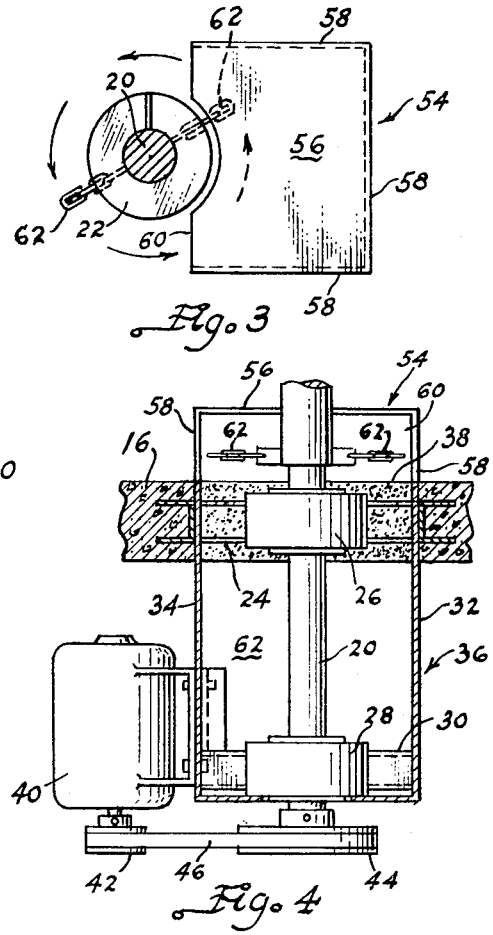
Fig. 3
Fig. 4
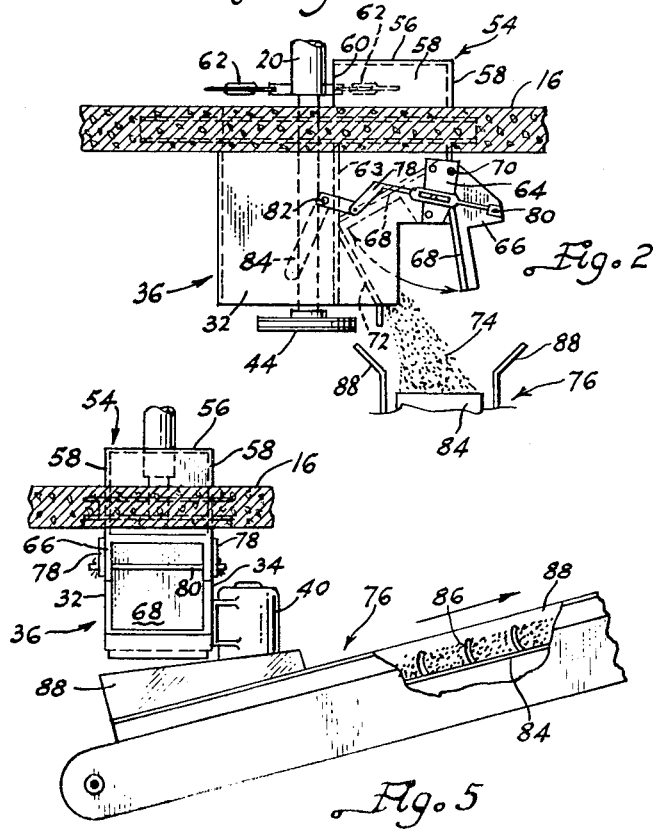
Fig. 2
Fig. 5
INVENTORS.
AARON Z. STAUFFER
JOHN H. HERR
JAMES W. LEPLEY
JAMES C. ZIMMERLY
By D. Heronsmust
ATTORNEY

BOTTOM DISCHARGE MEANS FOR SILO

BACKGROUND OF THE INVENTION

The present invention comprises an improvement over prior U.S. Pat. Nos. 3,424,350, dated Jan. 28, 1969 and 3,567,078, dated Mar. 2, 1971. Both of these prior patents pertain to Bottom Discharge Mechanisms for Silos. Particularly for purposes of simplifying said structures, while affording certain improvements therein, the present invention has been developed.

In general, providing bottom discharge mechanisms for silos which function effectively and continuously to provide substantially uniform discharge of the material from the interior of the silo is a difficult achievement. Especially in regard to silos of large capacity, where the height is of the order of 50 or 60 feet or more, it can be visualized that the pressure exerted by the full weight of the contents of a filled silo upon the lowermost portion thereof, such as adjacent the discharge opening in the bottom of the silo, is tremendous. Accordingly, the structures of the aforementioned patents have included augers having a coarse pitch and flexible chains which, when rotating in fully operative position, extend radially outward therefrom for purposes of dislodging the silage material adjacent the discharge opening in the bottom of the silo.

One of the difficulties resulting from such operation, however, is that about the time that a cavity of substantial diameter is developed in the lower portion of the compacted, stored silage material, through the operation of said dislodging mechanism, the weight of the material above the cavity causes the material to move downwardly in the silo and collapse the cavity. Frequently, this occurs suddenly and, in any event, the falling of appreciable quantities of compact silage material onto the bottom of the silo, and especially onto that portion on the bottom adjacent the discharge opening, causes a jamming and clogging of the discharge opening with which the dislodging mechanism provided in said aforementioned patents is not adequate to cope with readily as well as desired.

Various other types of bottom discharge mechanisms for silos have been devised, but, in general, none of these offer devices or mechanisms which adequately solve the problem of the clogging and jamming of the discharge openings which results from the dropping or falling of appreciable quantities of compacted silage material onto the bottom of the silo incident to the operation of the dislodging mechanism.

SUMMARY OF THE INVENTION

It is the principal object of the present invention to provide a bottom discharge mechanism for a silo means adjacent the discharge opening in the bottom thereof which prevents the clogging of the discharge opening when a mass of the silage material drops or falls onto the bottom of the silo and especially in the vicinity of the discharge opening, such means being of a nature which does not interfere with the operation of the dislodging mechanism and otherwise imposes no added burden upon the power to drive the dislodging mechanism.

Another object of the invention is to provide such improved means for preventing clogging of the discharge mechanism with mechanism that also operates as metering means to provide a more even rate of discharge of the silage material through the discharge opening than is possible by previous bottom discharge mechanisms for silos.

A still further object of the invention is to devise such metering mechanism in the form of a shield which has a substantially horizontal top spaced above the bottom of the silo and overlies the discharge opening therein to prevent falling silage material from passing directly and vertically through the discharge opening and thus, prevent clogging and jamming thereof.

Still another object of the invention is to provide the shield with side members extending downward from the edges thereof into engagement with the bottom of the silo adjacent the perimeter of the discharge opening but the side member at one side of said shield means being omitted to provide a lateral passage or opening through which silage material is moved by positively driven impelling means which operates progressively to feed silage material through the lateral opening and downward through the discharge opening in the bottom of the silo.

A still further object of the invention is to provide such impelling means in the form of short flexible members carried by the shaft which supports the auger in the lower portion of the silo at a level to move through the lateral opening of the shield means, thereby to insure the movement of silage material through said lateral opening and then downward through the discharge opening in the bottom of the silo.

One other object of the invention is to provide the bottom discharge means with a housing which is attachable to the bottom of the silo below the shield means and in vertical alignment with the auger shaft and discharge opening, said housing supporting power means and supporting bearings for the auger, and also to define a discharge chute which receives and guides falling material from the discharge opening in the bottom of the silo and directs it to transversely extending material removal means, such as an endless belt or the like.

One further object of the invention is to provide a closure for the discharge chute which, in the open position thereof, defines one wall of the discharge chute to guide the material into said aforementioned material removal means and, when the closure is in closed position, it extends transversely across the chute opening and thereby prevents the passage of material therethrough.

Still another object of the invention is to provide a portion of the drive means for the auger, which is disposed transversely adjacent the bottom of the housing, with an angularly extending deflecting guide in the discharge chute to prevent falling material from contacting said horizontally extending portion of the power means incident to guiding the material into said material removal means.

One further object of the invention is to provide power means in the form of an electric motor which is supported by one side of said housing and has a drive sheave thereon connectable by a belt or the like to the horizontally extending portion of the drive means referred to above, which is adjacent the lower end of the housing.

Details of the foregoing objects and of the invention, as well as other objects thereof, are set forth in the fol-

BRIEF DESCRIPTION OF THE DRAWING

FIG. 1 is a side elevation, partly in vertical section, showing bottom discharge means for the silo, which is illustrated in foreshortened manner, and embodying the principles of the present invention.

FIG. 2 is a fragmentary, enlarged side elevation of the essentially novel portions of the discharge means shown in FIG. 1 and illustrated as being supported by a portion of the bottom of the silo shown in FIG. 1, said bottom being in vertical section in FIG. 2.

FIG. 3 is a fragmentary plan view of a portion of the mechanism shown in FIG. 1 as seen on the line 3—3 thereof, part of said view being in horizontal section.

FIG. 4 is a vertical elevation, mostly in vertical section, and illustrating on an enlarged scale, as compared with FIGS. 1 and 2, powered drive means and supporting bearing means for the auger of the dislodging mechanism shown in FIGS. 1 and 2.

FIG. 5 is a fragmentary vertical elevation, partly in section, showing on a slightly smaller scale than in FIG. 2, the mechanism illustrated in FIG. 2 as seen from the right-hand side of FIG. 2.

DETAILED DESCRIPTION

The silo 10 may be of any conventional shape and formed from any conventional material. As illustrated, the same is shown as being formed from concrete. In addition to the exemplary cylindrical sidewall 12, the silo has a top 14 and a bottom 16. If desired, the bottom 16 may be substantially at ground level and a lower space 18 is provided beneath the bottom 16 to accommodate some of the mechanism shown in FIG. 1 which comprises part of the present invention.

Extending through the bottom 16 is a vertical shaft 20, the upper end of the shaft supporting an auger 22 which has a spiral flight thereon of relatively coarse pitch. Particularly, if the bottom 16 is formed from reinforced concrete, a short transversely extending beam structure 24 is embedded at its outer ends within the bottom 16 as shown in FIG. 4. The mid portion of the beam supports an upper bearing 26 through which the shaft 20 extends, the lower end of the shaft being supported in a bottom bearing 28 which is supported by another transversely extending beam structure 30. The opposite ends of beam structure 30 respectively are connected to the opposite sidewalls 32 and 34 of a housing 36. The housing is suitably connected to and extends downward from the bottom 16 of a silo.

The bottom 16 of the silo also is provided with a discharge opening 38 which is adjacent the axis of shaft 20 but at one side thereof, as shown in FIG. 1. The shaft 20 is driven by power means, preferably in the form of an electric motor 40. Said motor may conveniently be connected to and supported by the sidewall 34 of housing 36, for example, as shown in FIG. 4. The drive sheave 42 is connected to the lower end of the drive shaft of the motor 40 and a driven sheave 44, of substantially larger diameter than sheave 42, is connected to the lower end of shaft 20. As best shown in FIGS. 2 and 4, said lower end of shaft 20 extends below the bottom wall of the housing 36 and a flexible belt 46 or the equivalent extends around the sheaves 42 and 44 to transmit power therebetween, all of said mechanism being considered part of the drive means for the auger 22. It also will be understood that, if desired, sprockets and a sprocket chain may be substituted for elements 42, 44 and 46.

Extending from the auger 22 at vertically spaced locations are material-dislodging means which preferably are in the form of predetermined lengths of chains 48, which have digging elements 50 on the outer ends thereof for purposes of effectively engaging the compacted silage material 52 which is stored within the silo 10. As explained in detail in said aforementioned U.S. Pat. Nos. 3,424,350 and 3,567,078, to which attention is directed, when the silo 10 is being filled, the chopped silage material and the like falls to the bottom 16, and depending upon the height of the silo, it is conceivable, especially when the same is full, that intense compacting of the material occurs within the silo, especially adjacent the bottom it. When the dislodging mechanism comprising auger 22 and chains 48 are idle, as they are during such filling operation, chains will more or less hang vertically along the auger 22 and the material will compact around them.

When it is desired to remove or deliver some of the silage material from the silo 10, a motor 40 is energized and this rotates the auger 22 with the chains 48 somewhat coiled or wrapped around the auger. The flight of the auger, however, will result in initially commencing to dislodge some of the material and move the same downward, due to the spiral direction of the flight and the rotary direction in which the auger is driven, whereby the material passes through the discharge opening 38. In particular, this is the manner of operating the previous devices shown in aforementioned patents.

Gradually, as material is dislodged from the stored mass, due to engagement thereof by the auger 22 and the chains 48, a cavity begins to form in the body of the silage. The cavity enlarges gradually due to the centrifugal force of operation of the auger being imposed upon the chains, whereby the chains 48 eventually extend radially outward. Under such conditions, the digging elements 50 become more effective and efficient for purposes of digging into the compacted material causing it to fall downwardly toward the axis of the auger and discharge opening 38. However, when a fairly large cavity has been developed, the weight of the stored material above the cavity normally tends to cause the mass of material to drop down and collapse the cavity, whereupon the auger and chain continue to operate and develop a new cavity, in the manner described above, and so on until a desired amount of material has been removed through the discharge opening 38.

In accordance with the operation of said prior devices, it frequently occurs that, when material in the upper portion of the silo falls downwardly by the force of gravity into the cavity formed by the chain, it tends to jam and clog the discharge opening in the bottom of the silo. Such prior mechanisms have been as satisfactory as desired to react with such compacted and clogged material for purposes of freeing the opening. On occasions, it has been necessary for a workman to crawl into the space beneath the bottom or floor of the silo and manually dislodge the clogged material from the discharge opening so that feeding of the material therethrough can be resumed.

In order to obviate this difficulty, the present invention comprises shield means 54 which, in its simplest form, is somewhat box-shaped. It has a top 56 which is spaced above, and preferably, substantially completely overlies the discharge opening 38, as is best shown in FIG. 1. The top 56 of the shield means is supported by a plurality of sides 58 which are connected to the edges of the top and extend downward to and are connected suitably to the upper surface of the bottom 16 of the silo. Such sides preferably extend around three of the edges of the top 16, but the side 60 of the shield means is open, this being the side which is closest to the axis of shaft 20 and auger 22. Said open side comprises a laterally extending exit opening through which material which has accumulated around the lower end of auger 22 may pass so as to move to and through the discharge opening 38 in the bottom 16 of the silo.

In order that the material which has been moved downwardly to the lower end of the auger 22, by means of the operation thereof and the chains 48 thereon, may be induced positively to move through the exit opening comprising the open side 60 of shield means 54, the present invention provides impelling members 62 which, as best shown in FIGS. 2–4, are flexible and may conveniently comprise short lengths of chains connected at one end to the lower end of auger 22, for example, or the adjacent portion of shaft 20, if desired. Preferably, they are at a vertical elevation which permits them, when operating, to move through exit opening 60 in unidirectional manner, as indicated by the direction arrows in FIGS. 3. Such operation insures continual movement of the silage material through said exit opening 60 for passage therethrough and downward through the discharge opening 38 in bottom 16. Although short lengths of chain 62 have been illustrated specifically as embodying such impelling means, other equivalent mechanism may be substituted therefor, if desired, as long as the same positively moves the material into said laterally extending exit opening 60.

After the material has been delivered to and through the exit opening 38 in bottom 16 of the silo, further handling and guiding of the same is necessary and desired. This is effected by means of the housing 36 and especially the portions of the sidewalls 32 and 34 thereof which are directly below the shield means 54, and particularly the sides 58 thereof. Specifically, said sidewalls 32 and 34 have a transverse partition 63 extending therebetween and connected at its opposite edges respectively to said sidewalls.

The outermost edge portions of said sidewalls also have a pair of bearing plates 64 fixed thereto, shown in FIGS. 2 and 5, for purposes of supporting actuating ears 66 which extend perpendicularly from opposite edges of a planar closure member 68, the latter being shown in open position in full lines in FIG. 2, and the same being shown in phantom in said figure in closed position. The ears 66 are connected to bearing plates 64 by pivot bolts 70.

When the closure 68 is in open position as shown in full lines in FIG. 2, it depends vertically and is, more or less, parallel to the transverse partition 63. By such means, the portions of the sidewalls 32 and 34 which are between the partition 63 and the bearing plate 64 define a discharge chute when the closure 68 is in said aforementioned open position. However, in order to prevent the discharge material from contacting the transversely extending driven sheave 44, which comprises part of the drive mechanism, an additional angularly extending deflecting plate 72 is provided which extends between said sidewalls 32 and 34 and is connected at its opposite edges thereto. Plate 72 therefore effectively results in diverting the discharging silage material 74, shown in FIG. 2, into transversely extending material removing means 76, details of which are best shown in FIGS. 2 and 5.

The closure member 68 is movable between closed and open positions by suitable linkage means 78, several sets of which are respectively provided at opposite sides of the chute defined by sidewalls 32 and 34. One end of each set of linkage means 78 is connected to a transversely extending rod 80 which extends between the outer ends of the actuating ears 66 on closure 68. The opposite ends of said sets of linkage means are connected to another transversely extending rod 82, shown in FIG. 2, which extends through bearings respectively formed in the opposite sidewalls 32 and 34. An appropriate manually actuatable handle 84 is fixedly connected to one end of said rods so that it is capable of simultaneously actuating both sets of linkages 78 similarly and, thus, provide firm positioning of the closure 68 in either closed or open positions, as desired.

The material removing means 76 may be of any of a number of appropriate types. As shown in FIG. 5, the type selected comprises an endless belt 84 having spaced transverse flights 86 thereon so as to effectively carry silage material 88 upward and outward from beneath the lower end of the discharge chute on housing 36. At the receiving end of the removal means 76, a pair of outwardly extending wings 88 preferably are provided to prevent the spilling of the discharge material as it enters the removal means 76.

From the foregoing, it will readily be seen that the present invention provides, in particular, shield means 54 for preventing clogging or jamming of the discharge opening 38 in the bottom 16 of the silo in a manner which effects metering of the discharge material, regardless of how much falls downwardly toward the lower end of the auger 22. This results in continual discharge of the loosened material, at a substantially constant rate through the discharge opening 38, where it falls through the relatively simple chute, formed by the sidewalls of the housing 36 and the partition 63 and closure 68, when the closure is in open position. In particular, the chute means is of an extremely simple nature and, in addition, the housing 36 also provides ample means for supporting the bearings for the shaft 20 which supports the auger 22, as well as the drive means and the motor 40 to power the same.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. Bottom discharge means for a silo for storing pulverant material including an upstanding silo shell having a top to cover the upper end and a bottom extending across the lower portion thereof, and a discharge opening in said bottom near the center thereof, in combination with a shaft extending substantially vertically upward from said bottom adjacent said discharge opening, auger means on said shaft above said bottom having a coarse pitch operable to dislodge pulverant material within said silo shell, power means connected to said shaft and operable to rotate the same in a direction to cause said auger to move said material downwardly, and shield means positioned above and at least partially over said discharge opening to intersect falling material and prevent it from falling directly downwardly through said opening in said bottom and thereby prevent the same from jamming said opening incident to being discharged therethrough.

2. The discharge means according to claim 1 in which said shield means has an exit opening along one side thereof adjacent said shaft.

3. The discharge means according to claim 2 in which said exit opening in said shield means is within a substantially vertical plane and said shaft having material engaging means operable to extend substantially radially from said shaft when rotating and engage material adjacent the lower end of said auger and move it through said exit opening of said shield for passage through said discharge opening in said bottom of said silo.

4. The discharge means according to claim 2 in which said shield means has a substantially horizontal top approximately as large as said exit opening in said bottom of said silo and overlying the same, and said shield having side members extending to said bottom of said silo and supporting said shield above the same.

5. The discharge means according to claim 4 in which the side of said shield nearest said shaft has no side member, thereby to provide said exit opening in said shield.

6. The discharge means according to claim 5 in which the lower end of said auger is lower than the top of said shield means.

7. The discharge means according to claim 1 further including a housing adapted to be mounted below and connected to the bottom of said silo, said power means being connected to said housing, and bearings connected to said housing respectively adjacent the top and bottom of said housing to support the lower end portion of said shaft for rotation relative to said housing.

8. The discharge means according to claim 7 in which said housing has opposed sidewalls and a partition extending transversely between said sidewalls and downwardly from one edge of said discharge opening.

9. The discharge means according to claim 8 in which said partition and sidewalls of said housing define a discharge chute depending from the perimeter of said discharge opening, and said housing having a closure for said chute pivoted adjacent one side of said chute and extending substantially transversely across said chute when in closed position and substantially vertically downward from said pivot when in open position.

10. The discharge means according to claim 9 in which said pivot for said closure is substantially horizontal and adjacent the outer wall of said housing which is opposite said partition.

11. The discharge means according to claim 10 further including an operating handle pivotally supported by said housing and linkage connected between said handle and closure and operable to move said closure between open and closed positions thereof.

12. The discharge means according to claim 9 further including a material conveying means extending from beneath the lower end of said discharge chute laterally outward therefrom and having a hopper-like inlet positioned to receive material directly from said discharge chute.

13. The discharge means according to claim 12 in which a portion of the power means for said shaft comprises means extending horizontally across a portion of the bottom of said housing, and said housing including an angular deflecting guide in said discharge chute extending away from said horizontally extending portion of said power means to prevent material from contacting the same while being discharged.

14. The discharge means according to claim 13 in which said deflecting guide and closure coact with said opposing sidewalls of said housing to form the lower end portion of said discharge chute when said closure is in its open position.

15. The discharge means according to claim 14 further including conveyor means extending upward and outward from said discharge chute to receive material therefrom.

16. The discharge means according to claim 9 in which said bearings in said housing which are respectively adjacent the top and bottom thereof are also within an axis adjacent one side of said discharge opening, said discharge means also including a driven member connected to the lower end of said shaft, and said power means for said shaft comprising an electric motor mounted exteriorly of said housing adjacent one side thereof and having drive means connected to said driven member on said shaft.

* * * * *